United States Patent Office 3,335,895
Patented Aug. 15, 1967

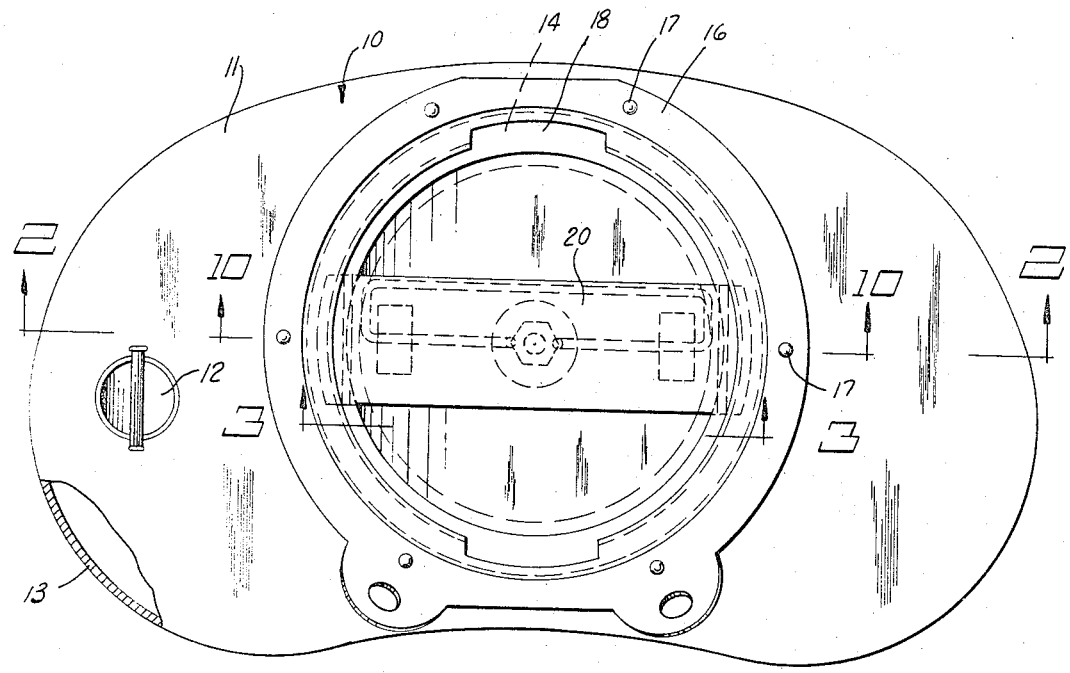
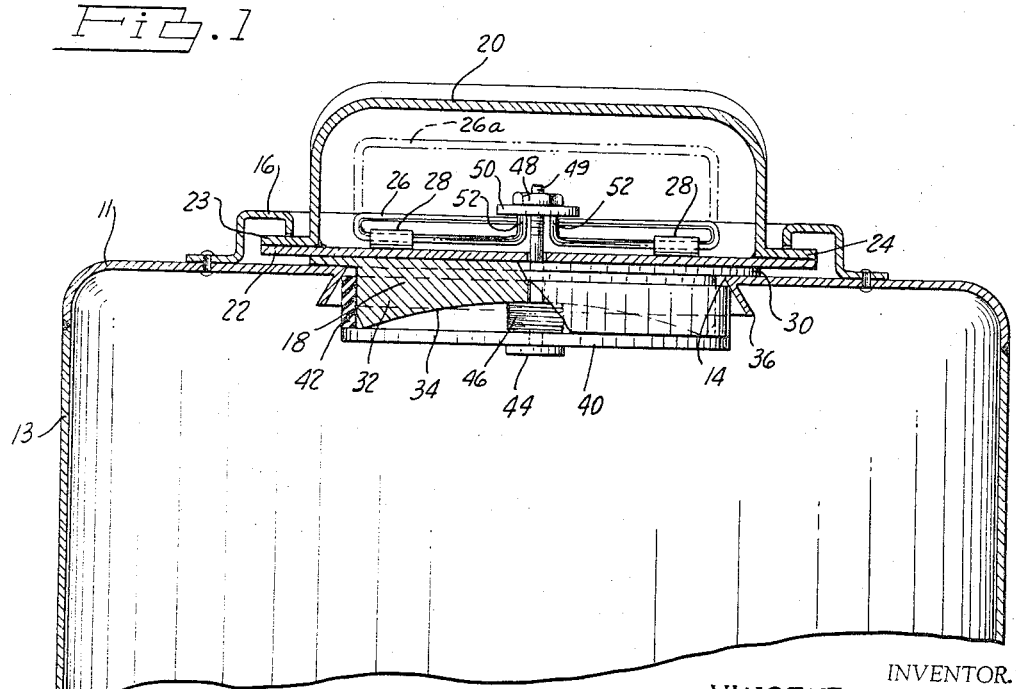

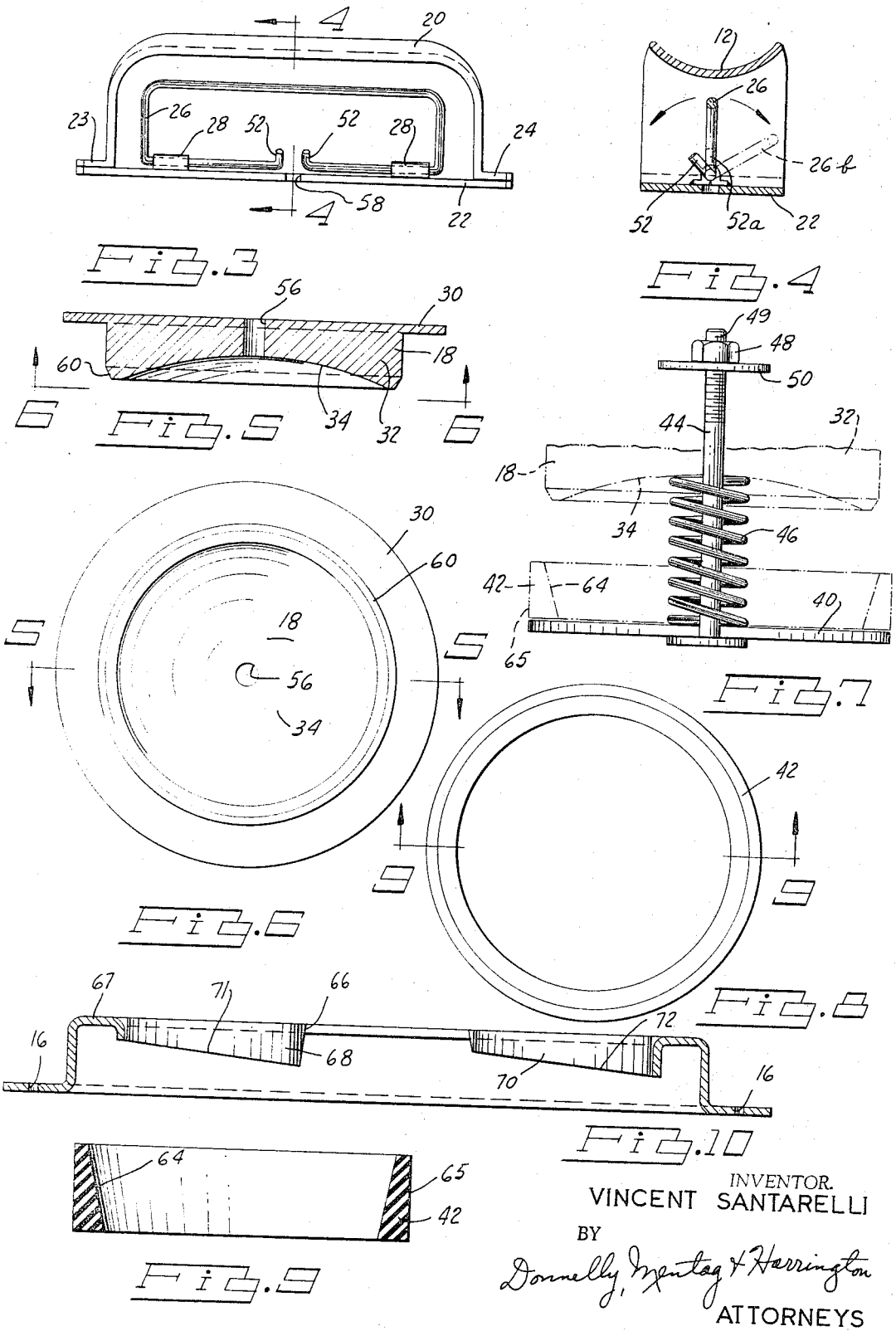

3,335,895
LOCKING COVER FOR RETAINING AND
RELEASING PRESSURE
Vincent Santarelli, 27551 Gail, Warren, Mich. 48093
Filed July 7, 1964, Ser. No. 380,806
11 Claims. (Cl. 220—24.5)

This invention relates to a cover for a pressurized container and, more particularly, to a cover for a pressurized container having safety provisions.

Pressurized containers for carrying gases and liquids under pressure and mixtures or combinations of these fluids are often employed. It is important that devices of this type be provided with safety devices which prevent injury to an operator who attempts to open one of these containers while the container is under pressure. Accordingly, it is an object of this invention to provide a pressurized container with a cover which cannot be removed without first releasing the fluid pressure within the container.

It is another object of this invention to provide a locking cover for a container which is to be employed with pressurized fluids which is simple in construction and includes provisions for protecting the operator from possible injury.

It is a further object of this invention to provide a locking cover for a container employed to transport pressurized fluids, which locking cover contains a minimum of parts and is easy to operate.

Briefly, in accordance with aspects of this invention, I have discovered a novel pressure type locking cover for a container which has a double locking apparatus including a locking flange which engages a portion of a carrying handle and a funnel-like surface on the interior of the container which engages a portion of the locking cover in fluid sealing relationship. Depending portions of the handle engage inturned flanges secured to the outer surface of the cover to prevent removal of the cover until the handle is first rotated. Advantageously, the locking arrangement includes means for preventing rotation of the handle until the pressure is first released by means of a pivotally mounted locking handle.

In accordance with other aspects of this invention, the cover is provided with a friction lock including a locking handle pivotally mounted on a plate secured or formed integrally with the container carrying handle and the locking handle is coupled by means of a cam and rod arrangement to a spring biased pressure plate which carries a rubber sleeve. The rubber sleeve has a tapering cross-section such that its inner surface engages a cylindrical surface of the cover, or lid, and when the pivotally mounted locking handle is pivoted, the pressure plate pulls the rubber sleeve into wedging engagement between the surface of the cover or lid and a cooperating tapered surface on the access opening of the container to define a friction lock and fluid seal. Because of the wedging engagement between the rubber sleeve and the opposed surfaces of the cover and access opening, the handle cannot be rotated to disengage the depending handle portions from the marginal flange until the locking handle is first pivoted to a released position, at which position cam surfaces release the pressure plate. When the pressure plate is released, the sleeve slides off of the cover and pressurized fluid in the container is permitted to pass to the ambient through a passageway extending axially through the cover, which passageway was previously sealed by means of the rubber sleeve cooperating with the pressure plate. When the locking handle is released, however, the pressure plate and sleeve move away from the cover a sufficient distance to permit the pressurized fluid to pass between the cover and the pressure plate and to exit to the ambient through the hole in the cover. After the pressure is released, the carrying handle may be rotated because the rubber sleeve no longer defines a frictional lock between the access opening and the cover, or lid, and the depending portions of the carrying handle may be disengaged from the marginal flange.

These and various other objects and features of the invention will be more clearly understood from a reading of the detailed description of the invention in conjunction with the drawing in which:

FIGURE 1 is a top plan view, partly broken away, of a pressurized container in which is mounted a locking cover according to this invention;

FIGURE 2 is a fragmentary view in elevation and in section, taken along the lines 2—2 of FIGURE 1, and looking in the direction of the arrows;

FIGURE 3 is a view in elevation and in section taken along the lines 3—3 of FIGURE 1, and looking in the direction of the arrows;

FIGURE 4 is a view in elevation and in section taken along the lines 4—4 of FIGURE 3, and looking in the direction of the arrows;

FIGURE 5 is a view in elevation and in section of a cover, taken along the line 5—5 of FIGURE 6, and looking in the direction of the arrows;

FIGURE 6 is a bottom plan view of the cover shown in FIGURE 5, taken along the line 6—6;

FIGURE 7 is a partial view in elevation of the pressure plate, the rubber sleeve, and the mechanism for moving the pressure plate and rubber sleeve into and out of engagement with the cover;

FIGURE 8 is a plan view of the rubber sleeve;

FIGURE 9 is a view in elevation and in section of the rubber sleeve taken along the lines 9—9 of FIGURE 8, and looking in the direction of the arrows; and, FIGURE 10 is a view in elevation and in section of the marginal flange mounted on the top of the container, taken along the line 10—10 of FIGURE 1, and looking in the direction of the arrows.

FIGURE 1 is a plan view of a pressurized container 10 in the top 11 of which is mounted a suitable pump 12. The pump 12 is for the purpose of introducing air pressure after liquid has been introduced through an opening 14 in the container 10. The opening 14 is encircled by a marginal flange 16 secured to the container by means of rivets 17 and which forms part of the cover locking arrangement for a cover 18. A carrying handle 20 is mounted on a suitable diametrically extending plate 22 shown in FIGURE 2. The plate 22 has its ends coterminous with the projecting ends 23, 24 of the handle 20 and the handle 20 rotatably supports a wire type cam member 26 by means of a pair of loops 28. The cover 18 is circular and includes a flange or peripheral edge 30 which has a diameter larger than the diameter of the opening 14 and a projecting portion 32 which is generally cylindrical in cross section and includes a curved surface 34. The cylindrical portion 32 has a diameter less than the diameter of the access opening 14. The access opening 14 is encircled by a tapered conical surface 36 which is formed integrally with the top 11 of the container 10 and the enlarged portion of this conical surface projects inwardly of the container from the access opening 14.

The container involves a novel pressure seal arrangement which includes a pressure plate 40, a resilient sleeve 42 which has a substantially cylindrical outer surface and a conically tapered inner surface and is supported by the periphery of the pressure plate 40. The pressure plate 40 is secured to a bolt 44, such as by welding, and a helical spring 46 encircles the projecting portion of the bolt 44 to form a part of the locking mechanism as will be subsequently described. On the opposite end of the bolt 44 from the pressure plate 40 is a nut 48 which threadably engages a threaded surface 49 and a washer 50. The washer 50 is engaged by a pair of cam-like ends 52 of the wire device 26 such that the bolt 44 will be reciprocated longitudinally by the force of the cam-like wire member 26 when moving in one direction and the force of the spring 46 when moving in the opposite direction.

When the pressure plate is held in the position shown in FIGURE 2, the resilient sleeve 42 is wedged between the conical surface 36 and the cylindrical portion 32 of the cover 18 to define a tight pressure seal. Also advantageously, the compressed resilient sleeve between the pressure plate and the conical surface 36 defines a friction lock which prevents rotation of the handle 20 to thus prevent accidental removal of the cover prior to the release of the pressurized fluid in the container 10. In other words, it is necessary first to move the wire locking handle 26 from the position shown in solid lines in FIGURE 2 to the position shown in dotted lines and indicated as 26a, in which position the cam ends 52 of the wire member 56 are in a position substantially parallel with the surface 11 of the container 10. When the pressure locking handle 26a is moved to its position indicated in dotted lines and designated 26a in FIGURE 2, the pressure plate 40 and the rubber sleeve 42 are moved away from the cylindrical portion 32 of the cover 18 by the spring 46 and the resilience of sleeve 42 to thus permit fluid under pressure to enter between the pressure plate 40 and the curved surface 34 of the cover 18 and this pressurized fluid will pass axially through the cover aperture 56, best seen in FIGURE 5 and around bolt 44. The structural details of the elements of this novel locking pressure cover are shown in FIGURES 3 through 10.

FIGURE 4 is a view in section taken along the lines 4—4 of FIGURE 3 and looking in the direction of the arrows and showing the cam device 26 in solid lines in an unlocked position and in dotted lines 26b in a locked position. The wire-like cam device is pivotally mounted on a plate 21 secured to the curved portion of the handle and the mounting is achieved by a pair of straps 28. In this view, the wire cam device 26 is shown in its unlocked position and the handle is shown as having a cylindrical aperture 58 centrally of the handle 20 and centrally of the plate 22. Pressurized fluid passes through this aperture 58 from the cylindrical passage 56 of the cover 18 shown in elevation and in section in FIGURE 5. From this view it is seen that the cam-like ends 52 of the locking handle 26 define an acute angle with respect to the main body portion of the wire locking handle 26. The cam-like ends 52 of the locking handle 26 are pivoted between the position defining an acute angle with the plate 22 of the cover 20 and a position defining a 90° angle with the plate 22 as indicated by 52a, in FIGURE 4. Thus it is apparent that the cam-like ends 52 will move the washer 50 away from the plate 22 as the locking handle 26 is moved from the unlocked position shown in full lines in FIGURE 4 to the locked position shown in dotted lines indicated by 26b in FIGURE 4.

As shown in FIGURE 5, the cover 18 has a conical surface 60 which tapers toward the axis of the cover 18 and is positioned adjacent the edge of the cylindrical portion 32 to assist the resilient sleeve 42 in engaging the periphery of the cylindrical portion 32. FIGURE 6 is a bottom plan view of the cover 18 and shows the axial location of the pressurized fluid passage 56 which passage also receives the bolt 44.

FIGURE 7 is a partial view in elevation of the pressure sealing arrangement in which the pressure plate 40 and the resilient sleeve 42 are shown in a released position in which the helical spring 46 has forced the plate 40 away from the cover 18. FIGURES 7, 8 and 9 include views of the resilient sleeve 42. In FIGURE 7 the sleeve 42 is shown in its released position relative to the cover 18 which rests on the pressure plate 40, this view being taken in elevation. In FIGURE 7, the tapered, or conical, inner surface 64 of the resilient sleeve 42 is shown as having a large diameter at its upper surface, which diameter is equal to a diameter intermediate the tapered surface 60 of the cover 18. Thus, as the resilient sleeve 42 is moved upwardly, as viewed in FIGURE 7, and engages the tapered surface 60 of the cover 18 it will be forced outwardly and over the periphery of the cylindrical portion 32. As the cam arms 52 of the locking handle 26 shown in FIGURES 2, 3 and 4 continue to move the washer 50 upwardly, the entire sleeve 42 will encircle the cylindrical portion 32 of the cover. This movement causes the pressure plate 40 to compress the helical spring 46 against the curved surface 34 of the cover 18. This operation continues until the locking cover arrangement reaches a position shown in elevation and in section in FIGURE 2. The outer surface 65 of the resilient sleeve 42 is preferably but not necessarily cylindrical. As shown in FIGURE 2, the sleeve is compressively held between the pressure plate 40, the conical surface 36 of the access opening 14 and the cylindrical portion 32 of the cover 18. This compression creates sufficient friction between the cover 18 and the conical surface 36 to prevent rotation of the handle 20 until the locking handle 26 is moved to its released position as indicated at 26a in FIGURE 2 or as indicated at 26 in FIGURE 4.

FIGURE 10 is a view in section of the marginal flange 16 and shows the structure by which the handle is engaged against axial movement relative to the opening. The marginal flange 16 includes a pair of diametrically opposed notches 66 in the circular outer surface 67 and downwardly depending tongues 68, 70 which have tapered surfaces 71, 72, respectively. When the handle 20 is placed on the access opening 14 the projecting portions 23, 24 of handle 20 are positioned to pass through the notches 66 such that the handle may be subsequently rotated with the projections 23, 24 engaging the tapered surfaces such as 71, 70. The rotation continues until the handle 20 has been rotated 90° to the position shown in FIGURE 1. The engagement of the depending portions 23, 24 of the handle 20 with the tapered surfaces, such as 71, 72, forces the cover 18 snugly to engage the periphery of the access opening 14. After the handle has been rotated 90° to the position shown in FIGURE 1, the locking handle is moved to its locked position shown in full lines in FIGURE 2. As previously stated, the handle 20 cannot be rotated until the locking handle is released because of the friction between the compressed resilient rubber sleeve 42, the pressure plate 40, the conical surface 36, and the cylindrical portion 32 of the cover 18.

While I have shown and described one illustrative embodiment of this invention, it is understood that the concepts thereof may be applied to other embodiments without departing from the spirit and scope of this invention.

What I claim is:

1. A container having an upper horizontal wall and an access opening therein and a closure for said opening comprising:
   a closure handle;
   a marginal flange on the exterior of said container wall encircling said opening and spaced apart therefrom;
   said handle having diametrically extended portions for extension under and engagement with said flange in a frictional locking relationship;
   a cover on which said handle is mounted, and said cover including a portion seated on the exterior surface of said container wall to enclose said opening and being locked in place by the handle portions engaging said flange;
   a pressure plate disposed in the container;
   a resilient sleeve positioned between said pressure plate and said cover;
   coupling means coupling said pressure plate to said cover;

said coupling means including spring means for applying a separating force to said pressure plate and said cover; and cam means for forcing said pressure plate toward said cover to compress said resilient sleeve into a sealing position between said container and said pressure plate to seal said cover.

2. The combination according to claim 1 wherein said cover includes a cylindrical portion seated within said resilient sleeve and having an outer diameter greater than the internal diameter of said resilient sleeve.

3. The combination according to claim 2 wherein said cover has a conical surface on the edge of said cylindrical portion for engaging said resilient sleeve and wherein said sleeve has a conical inner surface with the largest diameter of the inner surface of said resilient sleeve smaller than the diameter of the cylindrical portion of said cover, and greater than the smallest diameter of said conical surface of said cover.

4. The combination according to claim 1 wherein said cam means includes a locking handle pivotally mounted on said handle and having a cam portion depending therefrom.

5. The combination according to claim 1 wherein said coupling means includes a rod coupled to said locking plate and having a surface perpendicularly coupled thereto which surface is positioned adjacent to and engageable by said cam means.

6. The combination according to claim 1 wherein said cover and said handle include mating portions having communicating passages therethrough.

7. A container for pressurized fluids having an upper horizontal wall and an access opening therein and a locking closure for said opening comprising:

a handle including a pair of diametrically extended portions disposed over said opening;

a marginal flange on the exterior of said container wall encircling said opening and spaced apart therefrom and having a pair of diametrically opposed notches for receiving the extended portions of said handle and having at least a pair of angularly depending edges for frictionally engaging said handle extended portions and for forcing said extended portions toward said container wall;

a cover member on which said handle is mounted, and said cover including a portion seated on the exterior surface of said container wall to enclose said opening and being locked in place by the handle extended portions engaging said flange;

means connecting said cover to said handle;

a pressure plate and means coupling said pressure plate to said handle;

a resilient sleeve member positioned between said pressure plate and said cover, said cover and said handle having pressurized fluid passages therethrough in communication with the interior of said cover;

said coupling means including spring means normally positioning said pressure plate away from said cover; and cam means for overcoming the force of said spring means and drawing said pressure plate toward said cover to compress the resilient sleeve into a sealing position between the pressure plate, the cover, and the access opening.

8. The combination according to claim 7 wherein said resilient sleeve member engages the periphery of a portion of said cover member and wherein one of said members has a tapered conical surface and the other of said members has a cylindrical surface wherein said sleeve member frictionally engages said portion of said cover member and compresses between said cover member and said access opening.

9. The combination according to claim 7 wherein said coupling means includes a bolt having a head secured to the pressure plate, the body of said bolt extending through said fluid passages in said cover and said handle and having a washer mounted thereon.

10. The combination according to claim 7 wherein said cam means includes a locking handle pivotally mounted on said first mentioned handle and having a pair of cam arms engaging said washer on diametrically opposite surfaces relative to said bolt.

11. The combination according to Claim 10 wherein said locking handle and said cam arms are positioned at acute angles relative to each other and wherein said locking handle may be rotated between a position in axial alignment with said first mentioned handle to define an unlocked position and a position perpendicular thereto to define a locked position.

References Cited

UNITED STATES PATENTS

| | | | |
|---|---|---|---|
| 1,077,352 | 11/1913 | Kemp et al. | 220—24.5 |
| 1,759,732 | 5/1930 | Charlot | 220—25 |
| 1,903,168 | 3/1933 | Cordrey | 220—24.5 |
| 2,092,182 | 9/1937 | Ray | 220—24.5 |
| 2,178,868 | 11/1939 | Bullock | 220—40 |
| 3,244,316 | 4/1966 | Atkinson | 220—55.7 |

THERON E. CONDON, *Primary Examiner.*

JAMES R. GARRETT, *Examiner.*